(12) United States Patent
Toh et al.

(10) Patent No.: US 6,856,485 B2
(45) Date of Patent: Feb. 15, 2005

(54) BIASED RETAINING RING FOR DISC DRIVE

(75) Inventors: Michael Joo Chiang Toh, Singapore (SG); Xiong Liu, Singapore (SG); Joseph Cheng-Tsu Liu, Singapore (SG); Choonkiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/756,815

(22) Filed: Feb. 5, 2001

(65) Prior Publication Data

US 2001/0040770 A1 Nov. 15, 2001

Related U.S. Application Data

(60) Provisional application No. 60/184,701, filed on Feb. 24, 2000.

(51) Int. Cl.[7] .............................................. G11B 21/16
(52) U.S. Cl. .................................................. 360/99.08
(58) Field of Search ........................ 401/531; 360/265.7, 360/106, 104, 265.9, 266, 99.08, 99.07; 369/244

(56) References Cited

U.S. PATENT DOCUMENTS

| 3,976,307 A | * | 8/1976 | Ogisu ........................ 280/279 |
| 5,146,450 A | | 9/1992 | Brooks et al. |
| 5,654,849 A | | 8/1997 | Hassibi et al. |
| 5,666,243 A | * | 9/1997 | Brent ...................... 360/265.7 |
| 6,018,441 A | | 1/2000 | Wu et al. |

* cited by examiner

*Primary Examiner*—William Korzuch
*Assistant Examiner*—Mark Blouin
(74) *Attorney, Agent, or Firm*—Derek J. Berger

(57) ABSTRACT

A disc drive having a pivot cartridge and an actuator assembly. The actuator assembly consists of an actuator body which has a bore therein to receive the pivot cartridge. The actuator body further consists of an opening which serves as a ledge to engage a biased retaining ring. The biased retaining ring couples onto the pivot cartridge and forces the pivot cartridge to contact against one side of the bore of the actuator body.

10 Claims, 6 Drawing Sheets

BIASED RETAINING RING FOR DISC DRIVE

This patent application claims priority from U.S. Provisional application No. 60/184,701 filed Feb. 24, 2000.

FIELD OF THE INVENTION

The present invention relates generally to disc drives, and more particularly to a retaining ring for securing a pivot cartridge to an actuator assembly in a disc drive.

BACKGROUND OF THE INVENTION

The actuator assembly is widely used to position a transducer head which reads and writes data to selected tracks in a hard disc drive. A pivot cartridge supports the actuator assembly to provide smooth rotational movement of the assembly to pivot the transducer between tracks. The actuator assembly includes an actuator body having a bore into which the pivot cartridge is attached. The pivot cartridge can be attached to the bore by threaded fasteners, set screw, retaining ring, press-fit or adhesives.

One important mechanical resonance in the rotational movement of the actuator assembly is the pivot bearing translational mode. The servo bandwidth for high track density application where a higher frequency is required is limited by the frequency of this translational mode. For a given actuator assembly, this mode is determined by the pivot stiffness and the attachment method of the pivot cartridge to the actuator body.

For using threaded fasteners, set screw or press-fit, the pivot cartridge is forced to contact one side of the bore of the actuator body. Examples of such attachment methods suitable for use in disc drives, can be found in the specification of U.S. Pat. No. 5,146,450 entitled "Method and Apparatus for Bearing to Comb Attachment", by Peter E. Brooks et al, granted Sep. 8, 1992, U.S. Pat. No. 5,654,849 entitled "Molded Swing-Type Actuator Assembly With Press-Fit Pivot and Spring-Loaded Ground Conductor Elements", by Payman Hassibi et al, granted Aug. 5, 1997 and U.S. Pat. No. 6,018,441 entitled "Disk Drive Pivot Bearing and Actuator Arm Assembly", by Ruyue Y. Wu et al, granted Jan. 25, 2000. Although these attachment methods will give a higher translational mode frequency, they are however costly and time-consuming to assemble.

For using retaining ring, the cost is lower and easily assembled and disassembled. But, in comparison to the other methods, the retaining ring method suffers from lower translational mode frequency. At average, the frequency drops to approximately 5~10%. Unlike the more complicated methods, there is no contact between the pivot cartridge and the bore of the actuator body. Likewise, using adhesives will also result in lower translational mode frequency.

There remains a need for an improved and cheaper method to increase the frequency of the translational mode of the actuator assembly so that a higher servo bandwidth can be reached. It will be evident from the following description that the present invention offers this and other advantages.

SUMMARY OF THE INVENTION

The present invention relates to a simple assembling method that will give rise to higher translational mode frequency to solve the above problem.

According to one aspect of the invention, there is provided an actuator assembly in which an actuator body having a bore therein is inserted with a pivot cartridge. The actuator body has an opening which serves as a ledge to engage a biased retaining ring. The biased retaining ring couples onto the pivot cartridge and forces the pivot cartridge to contact against one side of the bore of the actuator body.

These and other features as well as advantages which characterize the present invention will be apparent upon reading of the following detailed description and review of the associated drawings.

DETAILED DESCRIPTION

Figure 1:
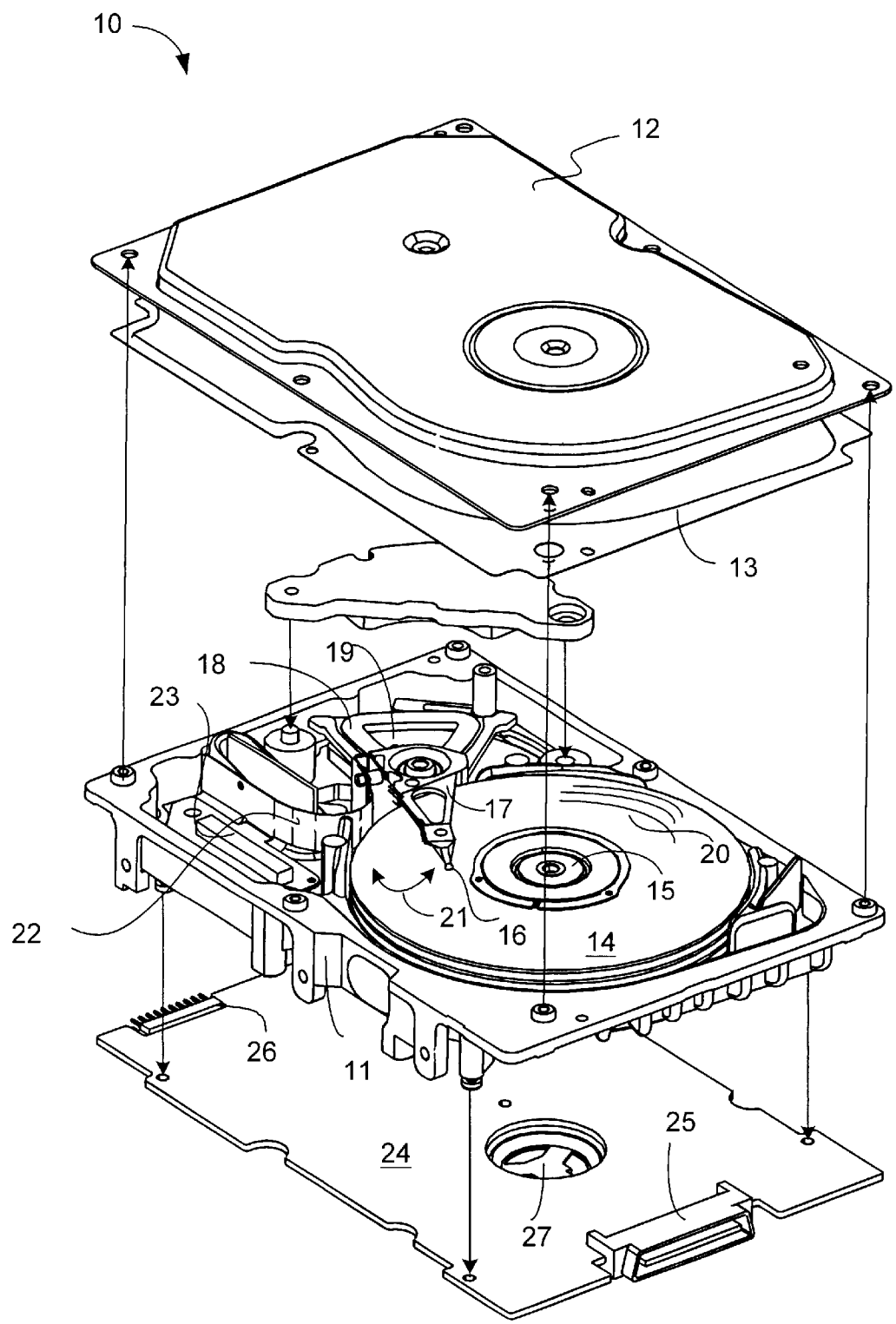
FIG. 1 is an exploded view of a typical disc drive.

FIG. 1 shows an exploded view of a convention disc drive 10. The disc drive 10 which includes a housing base 11 and a top cover 12, engages a gasket 13 to form a sealed housing. A plurality of discs 14 is mounted to rotate on a spindle motor hub 15. A plurality of transducer heads 16 is mounted to an actuator arm 17. The actuator arm 17 moves rotationally under the control of a voice coil motor which includes a voice coil 18 and magnets 19 so that the transducer heads 16 moves to a desired trace 20 along a path 21. The transducer heads 16 pass via a flex circuit 22 and a connector 23 to and from on a controller board 24. The controller board 24 includes a fiber channel interface 25, a serial port connector 26 and a hub connector 27. The actuator assembly which includes the actuator arm 17 and transducers 16 is mounted on the base 11 via a pivot cartridge.

A preferred embodiment of the present invention is described below with reference to FIGS. 2–5. An actuator assembly 28 in FIG. 2 includes an actuator body 29 which further includes a bore 30. A pivot cartridge 31 is to be inserted into the bore 30 of the actuator body 29 as shown. The pivot cartridge 31 has been traditionally secured to the actuator assembly 31 using attachment methods like the set screw, or the retaining ring mentioned earlier.

Figure 2:
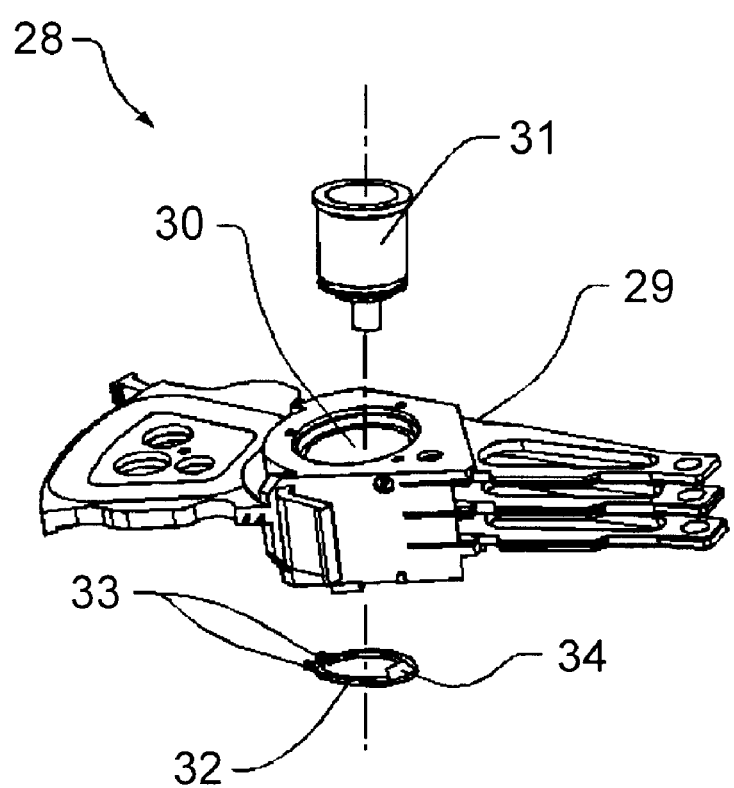
FIG. 2 shows a perspective view of a pivot cartridge, an actuator body and a retaining ring in an assembling sequence in the present invention.
Figure 3:
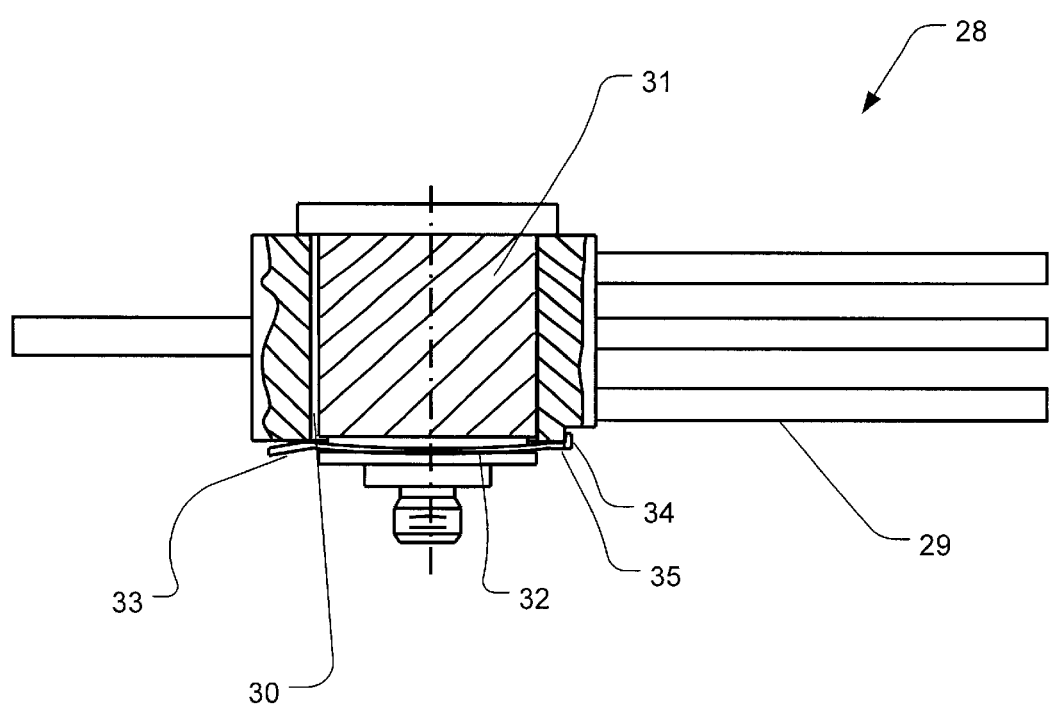
FIG. 3 shows a cross-sectional view of an actuator assembly where a retaining ring is used to secure a pivot cartridge to the assembly in the present invention.

A retaining ring 32 as shown in FIGS. 2 and 3, consists of a curve element at one end of the ring to act as a spring 33. The spring 33 is prised open to allow the retaining ring 32 to sit on the pivot cartridge 31 and when the spring 33 is released, the retaining ring 32 will grip onto the pivot cartridge 31. This is similar to the spring in a traditional retaining ring. However in the present invention, the retaining ring 32 has in addition, a hook 34 stamped at the other end of the same ring 32.

In FIG. 3, the pivot cartridge 31 is inside the bore 30 of the actuator body 29. As shown, the pivot cartridge 31 is leaning to one side of the bore 30 closer to the hook 34, leaving a part of the bore 30 closer to the spring 33 visible.

An opening, which cannot be seen in FIG. 3, is made into the actuator body 29. This opening serves as a ledge 35 where the hook 34 of the retaining ring 32 can engage.

Figure 4:
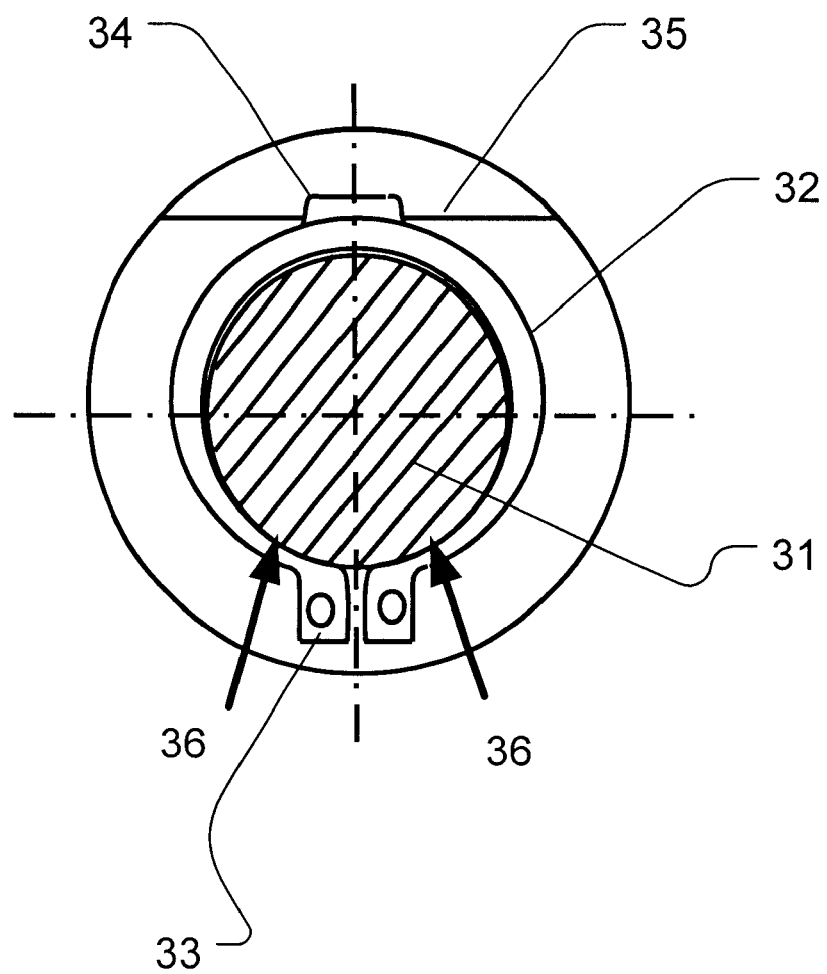
FIG. 4 shows a front view of a pivot cartridge secured by a retaining ring in the present invention.
Figure 5:
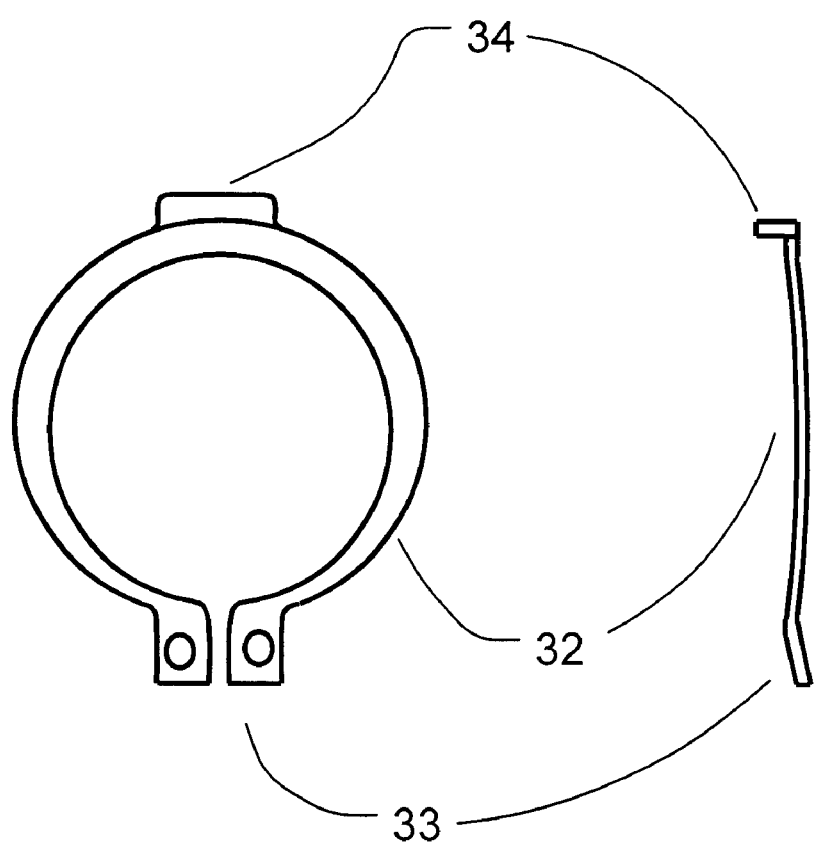
FIG. 5 is a front view and a side view of a retaining ring in the present invention.

FIG. 4 shows the view of the pivot cartridge 31 in engagement with the retaining ring 32. This engagement provides a biased force 36 which applies against the pivot cartridge 31 as illustrated. This allows the retaining ring 32 to controllably force the pivot cartridge 31 against one side of the bore 30 of the actuator body 29, unlike the traditional assembling method of using a retaining ring which does not allow any contact of the pivot cartridge with the bore of the actuator body. The biased force 36 applied can be adjusted by varying the stiffness of the retaining ring 32 or the gap from the ledge 35 to the bore 30 of the actuator body 29. In FIG. 5, the retaining ring 32 is shown clearly in the front and side views with the hook 34 at one of its end and the spring 33 residing at the other end.

The present invention hence provides and combines the advantages of the ease of assembly of a retaining ring, the intended function of a retaining ring to secure the pivot cartridge to the actuator body as well as the effect of using attachment methods like the set screw that give high translational mode frequency.

Four biased retaining rings have been fabricated and assembled into four different actuator assemblies. The frequency of the pivot bearing translational mode of the four actuator assemblies with the biased retaining rings and the frequency of the assemblies with the convention retaining rings have been measured to determine the effect. The results are tabulated as shown below:

TABLE 1

Measured Translational Mode Frequency of the Actuator Assembly Using Convention vs Biased Retaining Ring (Units on kHz)

| Sample | Convention Retaining Ring | Biased Retaining Ring | Difference |
| --- | --- | --- | --- |
| 1 | 4.37 | 4.58 | 0.21 |
| 2 | 4.42 | 4.58 | 0.16 |
| 3 | 4.42 | 4.56 | 0.14 |
| 4 | 4.50 | 4.67 | 0.17 |
| Average | 4.43 | 4.60 | 0.17 |

With results shown above, by using the biased retaining ring to secure the pivot cartridge to the actuator assembly, the average frequency of the translational mode has made an improvement on the average by 170 Hz.

Figure 6:
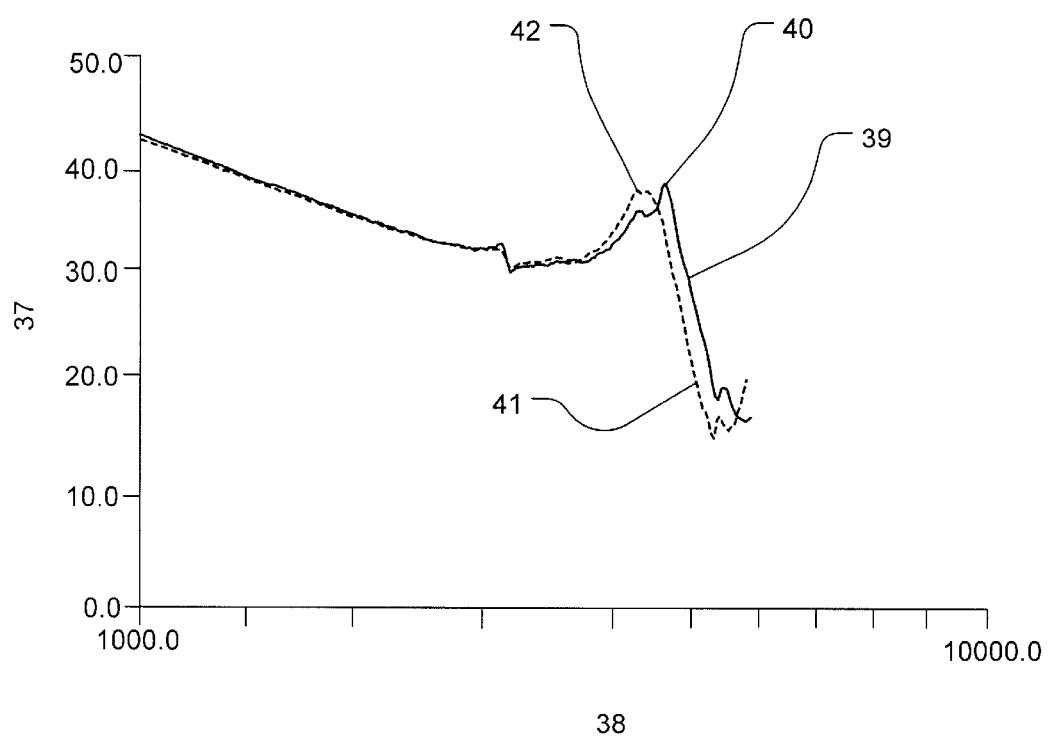
FIG. 6 is a Bode plot illustrating the transfer function of a actuator assembly using a retaining ring of the present invention compared to that of using a convention retaining ring.

FIG. 6 is a Bode plot for Sample 4 which measures Gain (dB) 37 against the Frequency (Hz) 38. This is an illustration to show the difference in the translational mode frequency between using the convention retaining ring and using the biased retaining ring for securing the pivot cartridge to the actuator body.

The Gain (dB) 37 is the logarithm of the actuator transfer function which is the amount of output per unit of input supplied and may be expressed as follows:

Gain (dB)=log|(output/input)|where input is the current supplied to the voice coil motor which drives the actuator assembly and output is measured in angular displacement of the actuator arm.

When the biased retaining ring is in use, the movement of the actuator arm will give rise to a plot 39 as shown in FIG. 6. The movement of the actuator arm will reach a peak as shown in FIG. 6 that constitutes the translational mode frequency 40. This translational mode frequency 40 is reached at approximately 4.67 kHz. On the other hand, when the convention retaining ring is in use, the movement of the actuator arm will give rise to a plot 41 shown in dashed line in FIG. 6. The movement of the actuator arm will reach a peak that constitutes the translational mode frequency 42. This translational mode frequency 42 is reached at approximately 4.50 kHz. As clearly illustrated, the translational mode frequency that could be achieved is higher for using the biased retaining ring than using a convention retaining ring. The improvement being 170 Hz as reflected in Sample 4 of Table 1.

Another way of describing the present invention is as follows:

In a disc drive 10, there comprises an actuator assembly 28 which includes an actuator body 29 having a bore 30, a pivot cartridge 31 and a retaining ring 32. The pivot cartridge 31 is inserted into the bore 30 of the actuator body 29. The retaining ring 32 is clipped onto the pivot cartridge 31. In doing so, the pivot cartridge 32 is biased towards one side of the bore 30 of the actuator body 29. The actuator body 29 has an opening which acts as a ledge 35 to allow engagement of the retaining ring 32. One end of the retaining ring 32 consists of a hook 34 which engages the ledge 35.

It is to be understood that even though numerous characteristics and advantages of various embodiments of the present invention have been set forth in the foregoing description, together with details of the structure and function of various embodiments of the invention, this disclosure is illustratively only, and changes may be made in detail, especially in the matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a disc drive, it will be appreciated by those skilled in the art that the teachings of the present invention can be applied to other systems, without departing from the scope and spirit of the present invention.

What is claimed is:

1. An actuator assembly comprising:
   an actuator body having a bore, the bore defining an internal surface;
   a pivot cartridge in the bore of the actuator body; and
   a retaining ring for biasing the pivot cartridge toward one portion of the internal surface and away from another portion of the internal surface.

2. An actuator assembly as claimed in claim 1, wherein the actuator body comprises a ledge spaced from the bore for engaging the retaining ring.

3. An actuator assembly as claimed in claim 2, wherein the retaining ring comprises a hook which engages the ledge.

4. The actuator assembly of claim 1, in which the retaining ring is split so as to define two ends, and further comprises a hook for engaging the actuator body, the hook being spaced from each end.

5. A disc drive comprising:
   an actuator body having a bore defining an internal surface;
   a pivot cartridge; and
   means for biasing the pivot cartridge toward one portion of the internal surface.

6. The disc drive of claim 5, in which the biasing means comprises a ledge formed in the actuator body spaced from the bore.

7. An actuator assembly comprising:

an actuator body comprising a vertically extending bore defining internal surface;

a pivot cartridge mounted in the bore, the pivot cartridge contacting one portion of the internal surface and being spaced from another portion of the internal surface horizontally spaced from the one portion of the internal surface; and a retaining ring for securing the pivot cartridge within the bore.

8. An actuator assembly as claimed in claim 7, wherein the actuator body comprises a ledge spaced from the bore for engaging the retaining ring.

9. An actuator assembly as claimed in claim 7, wherein the retaining ring comprises a hook at one end for engaging the actuator body.

10. The actuator assembly of claim 7, in which the ring is outside the bore.

* * * * *